United States Patent
Yang

(10) Patent No.: US 8,249,652 B2
(45) Date of Patent: Aug. 21, 2012

(54) MOBILE PHONE HAVING PERSONAL DEFENSE UNIT

(75) Inventor: Shun-Chuan Yang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 486 days.

(21) Appl. No.: 12/503,835

(22) Filed: Jul. 15, 2009

(65) Prior Publication Data

US 2010/0075713 A1   Mar. 25, 2010

(30) Foreign Application Priority Data

Sep. 19, 2008  (CN) .......................... 2008 1 0304558

(51) Int. Cl.
*H04M 1/00*  (2006.01)
*H04B 1/06*  (2006.01)
*H04B 1/38*  (2006.01)
*H04M 1/66*  (2006.01)
*H04M 1/68*  (2006.01)
*H04M 3/16*  (2006.01)

(52) U.S. Cl. .................... 455/556.1; 455/26.1; 455/410; 455/411; 455/550.1; 455/556.2; 455/557

(58) Field of Classification Search ............... 455/550.1, 455/556.1–556.2, 557, 410–411, 26.1
See application file for complete search history.

(56) References Cited

U.S. PATENT DOCUMENTS

| | | | | |
|---|---|---|---|---|
| 2005/0245282 A1* | 11/2005 | Brudos | ...................... | 455/550.1 |
| 2007/0132313 A1* | 6/2007 | Baeuerle | ...................... | 307/10.1 |
| 2010/0045237 A1* | 2/2010 | Liu | ............................... | 320/128 |

* cited by examiner

*Primary Examiner* — Jean A Gelin
*Assistant Examiner* — Munsoon Choo
(74) *Attorney, Agent, or Firm* — Altis Law Group, Inc.

(57) ABSTRACT

A mobile phone includes a power source, a power managing unit, a central controlling unit, a switching unit, and a personal defense unit. The power source is configured to provide the electrical energy to the mobile phone. The personal defense unit is configured to be heated by the current of the power source. The switching unit is connected between the power source and the personal defense unit. The central controlling unit is configured to receive a command triggered by a user operation on the mobile phone and to generate corresponding control signals to control connection and disconnection of the switching unit.

9 Claims, 3 Drawing Sheets

MOBILE PHONE HAVING PERSONAL DEFENSE UNIT

CROSS-REFERENCE TO RELATED APPLICATION

This application is related to, and claims the benefit of, a foreign priority application filed in China as Application No. 200810304558.3 on Sep. 19, 2008. The related application is incorporated herein by reference.

BACKGROUND

1. Technical Field

The present disclosure relates to mobile phones and, particularly, to a mobile phone having a personal defense unit.

2. Description of Related Art

Personal security is a concern for most people. However, carrying multiple defensive products, such as pepper spray, or taking expensive and time consuming training classes is an inconvenience.

Therefore, there is room for improvement within the art; and a mobile phone having a personal defense unit used for personal defense is provided.

DETAILED DESCRIPTION

Embodiments of the mobile phone will now be described in detail with reference to the drawings.

Figure 1:
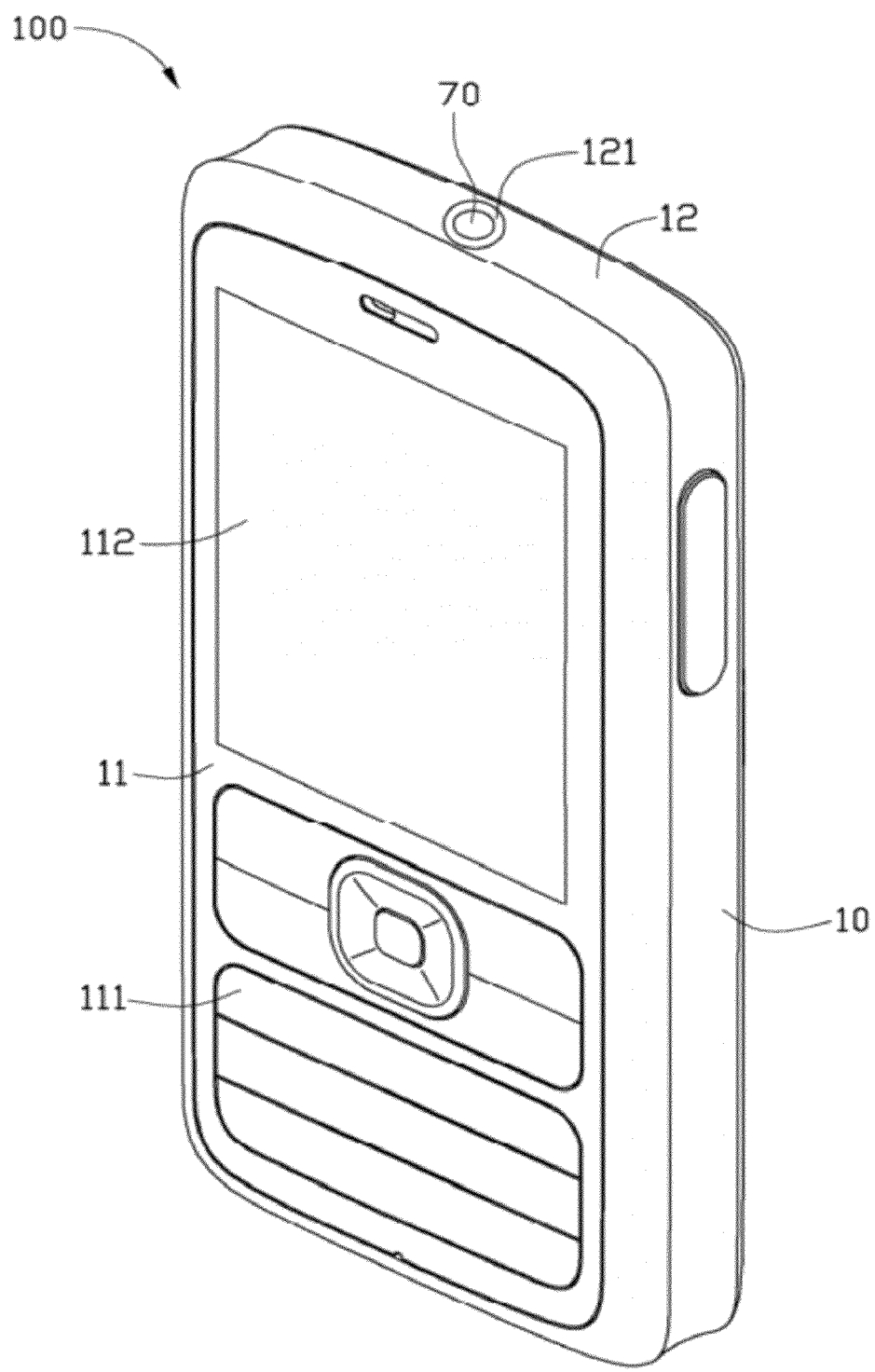
FIG. 1 is an isometric view of a mobile phone, according to the present disclosure.
Figure 2:
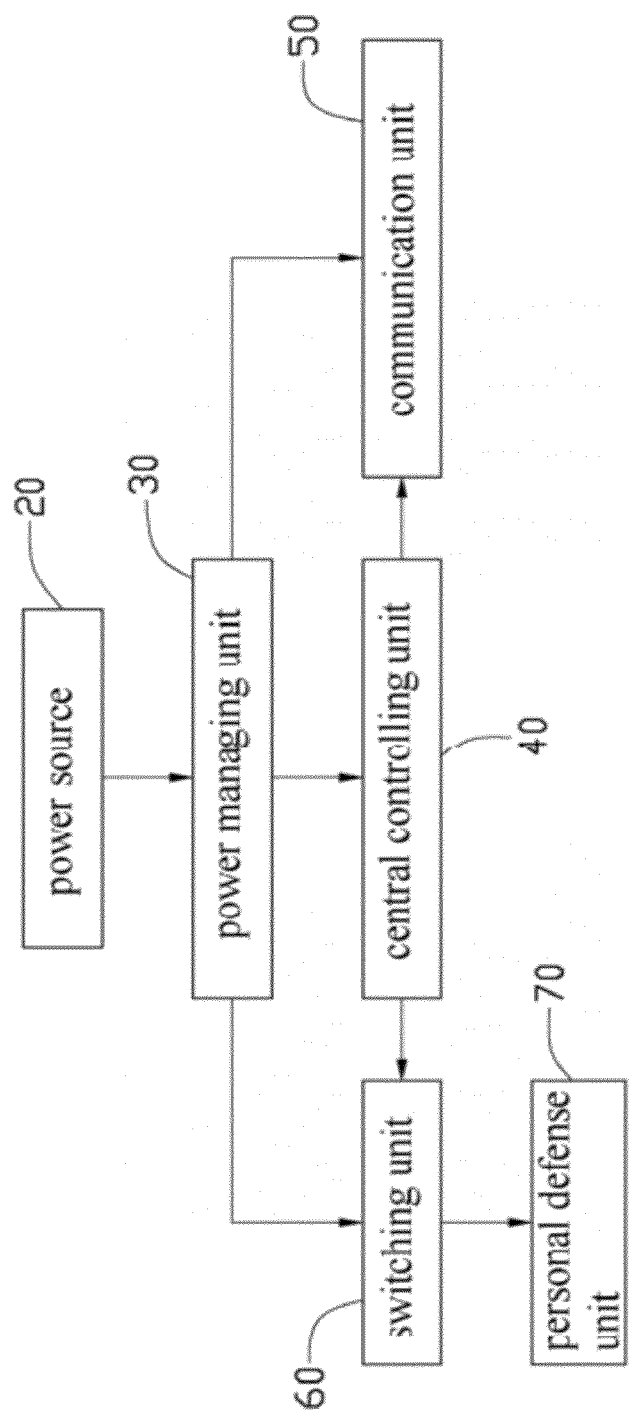
FIG. 2 is a functional block diagram of the mobile phone, according to the present disclosure.
Figure 3:
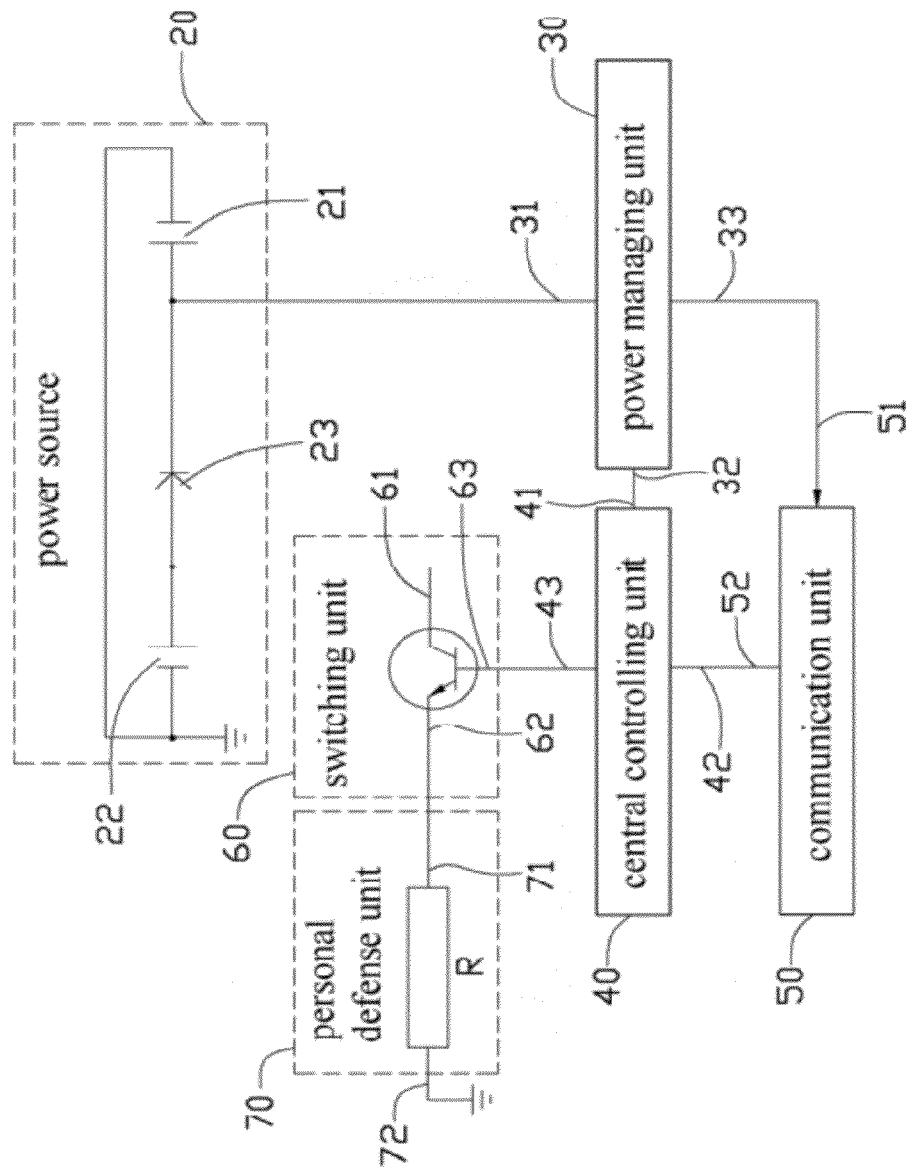
FIG. 3 is a schematic circuit diagram of the mobile phone, according to the present disclosure.

Referring to FIGS. 1-3, a mobile phone 100, according to an exemplary embodiment, includes a shell 10, a power source 20, a power managing unit 30, a central controlling unit 40, a communication unit 50, a switching unit 60, and a personal defense unit 70.

In this embodiment, the shell 10 is cuboid in shape, and includes a front surface 11 and an upper surface 12. The front surface 11 includes a touch area 111 and a screen area 112. The upper surface 12 is adjacent to the screen area 112. The shell 10 defines a receiving hole 121 in the upper surface 12.

The power source 20 includes a first battery 21, a second battery 22, and a diode 23. The first battery 21 includes a first positive pole and a first negative pole. The second battery 22 includes a second positive pole and a second negative pole. The second negative pole and the first negative pole are grounded. The diode 23 includes an anode and a cathode. The anode is coupled to the second positive pole, and the cathode is coupled to the first positive pole. The power source 20 is configured to provide the electrical energy to the mobile phone 100.

The power managing unit 30 includes a first input terminal 31, a first output terminal 32, and a second output terminal 33. The first input terminal 31 is coupled to the first battery 21 and the diode 23. The power managing unit 30 is a microcontroller that is configured to manage the power source 20.

The central controlling unit 40 includes a first input terminal 41, a first output terminal 42, and a second output terminal 43. The first input terminal 41 is coupled to the first output terminal 32 of the power managing unit 30. The central controlling unit 40 is configured to receive a command triggered by an operation on the touch area 111 by users and generate corresponding control signals to control the mobile phone 100.

The communication unit 50 includes a first input terminal 51 and a second input terminal 52. The first input terminal 51 is coupled to the second output terminal 33 of the power managing unit 30. The second input terminal 52 is coupled to the first output terminal 42 of the central controlling unit 40. The communication unit 50 is configured to send and receive radio signals for telecommunication.

The switching unit 60 includes an input terminal 61, an output terminal 62, and a control terminal 63. The control terminal 63 is used to control connection and disconnection between the input terminal 61 and the output terminal 62. The input terminal 61 is coupled to the second battery 22 and the diode 23. The control terminal 63 is coupled to the second output terminal 43 of the central controlling unit 40. The switching unit 60 performs the connection and disconnection according to the control signals from the central controlling unit 40. In this embodiment, the switching unit 60 is a NPN-type bipolar junction transistor (BJT), the input terminal 61 is the collector, the output terminal 62 is the emitter, and the control terminal 63 is the base.

The personal defense unit 70 is received in the receiving hole 121 and includes an input terminal 71 and an output terminal 72. The input terminal 71 is coupled to the output terminal 62. The output terminal 72 is grounded. In this embodiment, the personal defense unit 70 is a resistor.

In normal use, the power managing unit 30 transforms output voltage of the first battery 21 to a working voltage of the communication unit 50. When the first battery 21 is being used, the output voltage of the first battery 21 decreases. Once the voltage drop between the second positive pole of first battery 21 and the first positive pole of the second battery 22 is higher than the threshold voltage of the diode 23, the diode 23 is conducted. The second battery 22 can provide electrical energy to the power managing unit 30.

When the user of the mobile phone 100 wants to use the personal defense unit 70, the user can trigger the command by operation on the touch area 111. The central controlling unit 40 receives the command and generates corresponding control signals and alert signals. The control terminal 63 receives the control signals. The switching unit 60 is turned on and the input terminal 61 is electrically connected to the output terminal 62. Correspondingly, the current of the second battery 22 flows from the switching unit 60 to the personal defense unit 70. Thus the temperature of the personal defense unit 70 rises. Then the user can use the personal defense unit 70 of the mobile phone 100 to defend him or herself.

As the second battery 22 provides the electrical energy to the personal defense unit 70, the output voltage of the second battery 22 decreases. When the voltage dropped between the second positive pole of first battery 21 and the first positive pole of the second battery 22 is lower than the threshold voltage of the diode 23, the diode 23 remains in the reverse blocking state. Therefore, the personal defense unit 70 will not influence the communication of the mobile phone 100.

Beneficially, when the second input terminal 52 of the communication unit 50 accepts the alert signals, the communication unit 50 can send out an alert message to a service station such as a local police station.

It will be understood that the above particular embodiments and methods are shown and described by way of illustration only. The principles and the features of the present invention may be employed in various and numerous embodiment thereof without departing from the scope of the inven-

What is claimed is:

1. A mobile phone comprising:
a power source configured to provide electrical energy for the mobile phone;
a personal defense unit configured to be heated by the current of the power source;
a switching unit connected between the power source and the personal defense unit; and
a central controlling unit configured to receive a command triggered by a user operation on the mobile phone and to generate corresponding control signals to control connection and disconnection of the switching unit;
wherein the power source includes a first battery, a second battery, and a diode, the first battery includes a first positive pole and a first negative pole being grounded; the second battery includes a second positive pole and a second negative pole being grounded; and the diode includes an anode coupled to the second positive pole and a cathode coupled to the first positive pole;
the mobile phone further comprises a power managing unit configured to manage the electrical energy of the power source; and the power managing unit includes a first input terminal coupled to the first battery and the diode, a first output terminal coupled to the central controlling unit, and a second output terminal.

2. The mobile phone in claim 1, wherein the central controlling unit includes a first input terminal coupled to the first output terminal of the power managing unit, a first output terminal, and a second output terminal coupled to the switching unit.

3. The mobile phone in claim 2, wherein the switching unit includes an input terminal coupled to the second battery and the diode, an output terminal coupled to the personal defense unit, and a control terminal coupled to the second output terminal of the central controlling unit.

4. The mobile phone in claim 3, wherein the switching unit is a NPN-type bipolar junction transistor, the input terminal is the collector, the output terminal is the emitter, and the control terminal is the base.

5. The mobile phone in claim 3, wherein the personal defense unit includes an input terminal coupled to the output terminal of the switching unit and an output terminal being grounded.

6. The mobile phone in claim 5, wherein the personal defense unit is a resistor.

7. The mobile phone in claim 5, wherein the mobile phone further comprises a communication unit, the communication unit is configured to send and receive radio signals for telecommunication; and the communication unit includes a first input terminal coupled to the second output terminal of the power managing unit and a second input terminal coupled to the first output terminal of the central controlling unit.

8. The mobile phone in claim 1, wherein the mobile phone further includes a shell, and the shell defines a receiving hole for receiving the personal defense unit.

9. The mobile phone in claim 8, wherein a surface of the shell comprises a touch area and a screen area, and the user operation triggering on the touch screen is configured to generate the corresponding control signals.

* * * * *